(12) United States Patent
Goto et al.

(10) Patent No.: US 11,511,459 B2
(45) Date of Patent: *Nov. 29, 2022

(54) METHOD OF PRODUCING HONEYCOMB STRUCTURED BODY

(71) Applicants: IBIDEN CO., LTD., Ogaki (JP); TOYOTA JIDOSHA KABUSHIKI KAISHA, Toyota (JP)

(72) Inventors: Shinnosuke Goto, Ibi-gun (JP); Masaru Kakinohana, Toyota (JP); Takeru Yoshida, Toyota (JP); Hiromasa Suzuki, Toyota (JP); Takumi Tojo, Toyota (JP)

(73) Assignees: IBIDEN CO., LTD., Ogaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 623 days.

This patent is subject to a terminal disclaimer.

(21) Appl. No.: 16/566,891

(22) Filed: Sep. 11, 2019

(65) Prior Publication Data

US 2020/0078984 A1    Mar. 12, 2020

(30) Foreign Application Priority Data

Sep. 12, 2018    (JP) .............................. JP2018-170620

(51) Int. Cl.
*B01J 21/04* (2006.01)
*B01J 21/06* (2006.01)
(Continued)

(52) U.S. Cl.
CPC ................ *B28B 3/20* (2013.01); *B01J 23/63* (2013.01); *B01J 35/04* (2013.01); *B01J 37/0018* (2013.01);
(Continued)

(58) Field of Classification Search
CPC . B01J 21/04; B01J 21/066; B01J 23/63; B01J 35/04; B01J 37/0018; B01J 37/02;
(Continued)

(56) References Cited

U.S. PATENT DOCUMENTS

| 4,708,946 A * | 11/1987 | Ohata | ...................... B01J 35/04 |
| | | | 423/213.5 |
| 4,904,633 A * | 2/1990 | Ohata | ...................... B01J 23/63 |
| | | | 502/328 |

(Continued)

FOREIGN PATENT DOCUMENTS

| CN | 1969073 | 5/2007 |
| CN | 1997452 | 7/2007 |

(Continued)

OTHER PUBLICATIONS

Hongwei et al., "The Research Progress on the Treatment of Glass Fiber Surface by Nanomaterial", Journal of Ceramics, Dec. 2015, vol. 36 No. 6, (English abstract included, w/ concise explanation).

(Continued)

*Primary Examiner* — Cam N. Nguyen
(74) *Attorney, Agent, or Firm* — Mori & Ward, LLP

(57) ABSTRACT

The present invention provides a method of producing a honeycomb structured body having excellent mechanical strength. The present invention relates to a method of producing a honeycomb structured body including a honeycomb fired body in which multiple through-holes are arranged longitudinally in parallel with one another with a partition wall therebetween, the method including: a raw material mixing step of preparing a raw material paste containing ceria-zirconia composite oxide particles, alumina particles, an inorganic binder, and inorganic fibers; a molding step of molding the raw material paste into a honeycomb molded body in which multiple through-holes are arranged longitudinally in parallel with one another with a partition (Continued)

wall therebetween; a drying step of drying the honeycomb molded body obtained in the molding step; and a firing step of firing the honeycomb molded body dried in the drying step into a honeycomb fired body, wherein the raw material mixing step includes pre-mixing of the inorganic binder and the inorganic fibers.

7 Claims, 2 Drawing Sheets

(51) Int. Cl.
- B01J 23/63 (2006.01)
- B01J 35/04 (2006.01)
- B01J 37/00 (2006.01)
- B01J 37/02 (2006.01)
- B01J 37/08 (2006.01)
- B01D 53/94 (2006.01)
- B28B 3/20 (2006.01)
- B28B 11/24 (2006.01)

(52) U.S. Cl.
CPC .............. *B01J 37/02* (2013.01); *B01J 37/08* (2013.01); *B28B 11/243* (2013.01); *B01D 53/94* (2013.01); *B01D 2255/10* (2013.01); *B28B 2003/203* (2013.01)

(58) Field of Classification Search
CPC ..... B01J 37/08; B01J 53/94; B01J 3/20; B01J 11/243
USPC ......................... 502/304, 349, 355, 415, 439
See application file for complete search history.

(56) References Cited

U.S. PATENT DOCUMENTS

| | | | | |
|---|---|---|---|---|
| 6,107,235 A * | 8/2000 | Matsuzawa | .......... | B01J 37/0009 502/223 |
| 6,335,305 B1 * | 1/2002 | Suzuki | ................ | B01D 53/945 502/328 |
| 8,039,088 B2 * | 10/2011 | Ohno | .................. | B01J 37/0009 428/116 |
| 8,179,063 B2 * | 5/2012 | Hahle | ....................... | B60L 7/08 318/376 |
| 8,211,818 B2 * | 7/2012 | Kunieda | ................ | C04B 35/16 502/64 |
| 8,227,368 B2 * | 7/2012 | Ohno | .................. | B01J 29/7615 502/71 |
| 8,609,047 B2 * | 12/2013 | Dotzel | ................... | F01N 3/035 502/64 |
| 8,658,104 B2 * | 2/2014 | Matsukawa | ........... | C04B 35/447 422/180 |
| 8,808,633 B2 * | 8/2014 | Kunieda | ................ | C01B 37/08 422/177 |
| 8,932,532 B2 * | 1/2015 | Kunieda | ................ | B01J 29/88 422/177 |
| 8,961,886 B2 * | 2/2015 | Kunieda | ............. | C04B 35/6303 422/177 |
| 9,040,003 B2 * | 5/2015 | Andersen | ............ | C04B 38/0006 423/210 |
| 9,284,874 B2 * | 3/2016 | Nishio | .................. | F01N 3/2803 |
| 9,289,754 B2 * | 3/2016 | Kikuchi | ................ | B01J 27/224 |
| 9,409,152 B2 * | 8/2016 | Kumatani | ............. | B01J 35/023 |
| 9,410,463 B2 * | 8/2016 | Nishio | .................. | F01N 3/2828 |
| 10,472,290 B2 * | 11/2019 | Goto | ........................ | B01J 23/63 |
| 10,603,658 B1 * | 3/2020 | Makino | .................... | B01J 21/04 |
| 11,298,685 B2 * | 4/2022 | Goto | ..................... | F01N 3/2828 |
| 11,298,686 B2 * | 4/2022 | Goto | ...................... | F01N 3/101 |
| 2006/0292339 A1 | 12/2006 | Ohno et al. | | |
| 2007/0289275 A1 | 12/2007 | Ohno et al. | | |
| 2008/0276586 A1 | 11/2008 | Oya et al. | | |
| 2009/0291840 A1 * | 11/2009 | Ohno | .................... | B01J 37/0009 502/340 |
| 2011/0116983 A1 * | 5/2011 | Kunieda | ................ | C04B 35/447 422/177 |
| 2013/0062275 A1 * | 3/2013 | Kobashi | ................. | B01D 39/14 264/49 |
| 2014/0112835 A1 * | 4/2014 | Nishio | .................. | F01N 3/2828 422/180 |
| 2014/0147673 A1 * | 5/2014 | Kunieda | ................ | C01B 37/08 428/116 |
| 2015/0065334 A1 * | 3/2015 | Sato | ..................... | B01J 29/7015 502/64 |
| 2015/0321185 A1 * | 11/2015 | Ueno | .................. | B01J 29/7615 502/66 |
| 2015/0343532 A1 | 12/2015 | Yang et al. | | |
| 2017/0326647 A1 | 11/2017 | Yang et al. | | |
| 2019/0143312 A1 * | 5/2019 | Goto | .................. | C04B 35/6268 502/304 |
| 2019/0144342 A1 | 5/2019 | Goto et al. | | |
| 2020/0222884 A1 * | 7/2020 | Goto | ..................... | F01N 3/2828 |

FOREIGN PATENT DOCUMENTS

| | | |
|---|---|---|
| CN | 102630184 | 8/2012 |
| CN | 104797361 | 7/2015 |
| CN | 107556028 | 1/2018 |
| CN | 108404520 | 8/2018 |
| WO | WO 2008/139564 | 11/2008 |
| WO | WO 2011/066490 | 6/2011 |
| WO | WO 2018/012565 | 1/2018 |

OTHER PUBLICATIONS

Chinese Office Action for corresponding CN Application No. 201910853553.4, dated Jul. 19, 2021.

* cited by examiner

METHOD OF PRODUCING HONEYCOMB STRUCTURED BODY

TECHNICAL FIELD

The present invention relates to a method of producing a honeycomb structured body.

BACKGROUND ART

Exhaust gas discharged from internal combustion engines of automobiles and the like contains particulate matter (PM) and harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer that is formed by wash-coating a honeycomb-shaped monolithic substrate made of cordierite or the like with slurry containing noble metal particles having catalytic activity.

Patent Literature 1 discloses a method of producing a honeycomb structured body, the method including extrusion-molding a raw material paste containing ceria-zirconia composite oxide particles (hereinafter also referred to as "CZ particles), alumina particles, inorganic fibers (inorganic fibers), and an inorganic binder to obtain an extrudate, and drying and firing the extrudate.

CITATION LIST

Patent Literature

Patent Literature 1: WO 2018/012565

SUMMARY OF INVENTION

Technical Problem

Unfortunately, a honeycomb structured body produced by the method disclosed in Patent Literature 1 has insufficient mechanical strength.

As a result of extensive studies on the above problem, the inventors assumed that the cause of the problem might be low bonding strength between inorganic fibers added as a reinforcement material and other materials, because a cross section obtained by breaking a honeycomb structured body by three-point bending indicated pulling out of the inorganic fibers.

The present invention was made to solve the above problem. An aim of the present invention is to provide a method of producing a honeycomb structured body having excellent mechanical strength.

Solution to Problem

The present invention provides a method of producing a honeycomb structured body including a honeycomb fired body in which multiple through-holes are arranged longitudinally in parallel with one another with a partition wall therebetween, the method including: a raw material mixing step of preparing a raw material paste containing ceria-zirconia composite oxide particles, alumina particles, an inorganic binder, and inorganic fibers; a molding step of molding the raw material paste into a honeycomb molded body in which multiple through-holes are arranged longitudinally in parallel with one another with a partition wall therebetween; a drying step of drying the honeycomb molded body obtained in the molding step; and a firing step of firing the honeycomb molded body dried in the drying step into a honeycomb fired body, wherein the raw material mixing step includes pre-mixing of the inorganic binder and the inorganic fibers.

When the inorganic binder and the inorganic fibers are mixed with other materials at once, the inorganic binder is preferentially attached to the surfaces of the CZ particles and the alumina particles each having a large specific surface area, making the inorganic binder less attachable to the surfaces of the inorganic fibers. Thus, the bonding between the inorganic fibers and the inorganic binder is presumably insufficient, reducing the bonding strength of the inorganic fibers.

In contrast, in the method of producing a honeycomb structured body of the present invention, the inorganic binder and the inorganic fibers are pre-mixed together in the raw material mixing step.

Pre-mixing of the inorganic binder and the inorganic fibers can increase the amount of the inorganic binder present on the surfaces of the inorganic fibers, which can presumably increase the bonding strength between the inorganic fibers and other materials.

The inorganic fibers refer to those having an aspect ratio of 5 or more.

In the method of producing a honeycomb structured body of the present invention, the inorganic binder is preferably boehmite.

Boehmite is alumina monohydrate with a composition of AlOOH, and has good dispersibility in media such as water. Thus, in the method for producing a honeycomb structured body of the present invention, boehmite is preferably used as the inorganic binder.

In the method of producing a honeycomb structured body of the present invention, the inorganic fibers are preferably alumina fibers.

When the inorganic fibers are alumina fibers, the honeycomb structured body has higher heat resistance.

In the method of producing a honeycomb structured body of the present invention, in the raw material mixing step, the weight ratio of the ceria-zirconia composite oxide particles to the alumina particles (ceria-zirconia composite oxide particles/alumina particles) is preferably 1.0 to 3.0.

When the weight ratio (ceria-zirconia composite oxide particles/alumina particles) is 1.0 to 3.0, the ceria-zirconia composite oxide particle content is high, which improves the exhaust gas conversion performance because the ceria-zirconia composite oxide particles are used as co-catalysts.

The method of producing a honeycomb structured body of the present invention preferably further includes a supporting step of allowing a noble metal to be supported on the honeycomb fired body.

The honeycomb structured body can be used as a honeycomb catalytic converter for exhaust gas conversion with a noble metal supported on the honeycomb fired body.

DESCRIPTION OF EMBODIMENTS

[Honeycomb Structured Body]

First, a honeycomb structured body that can be obtained by the method of producing a honeycomb structured body of the present invention is described.

Figure 1:
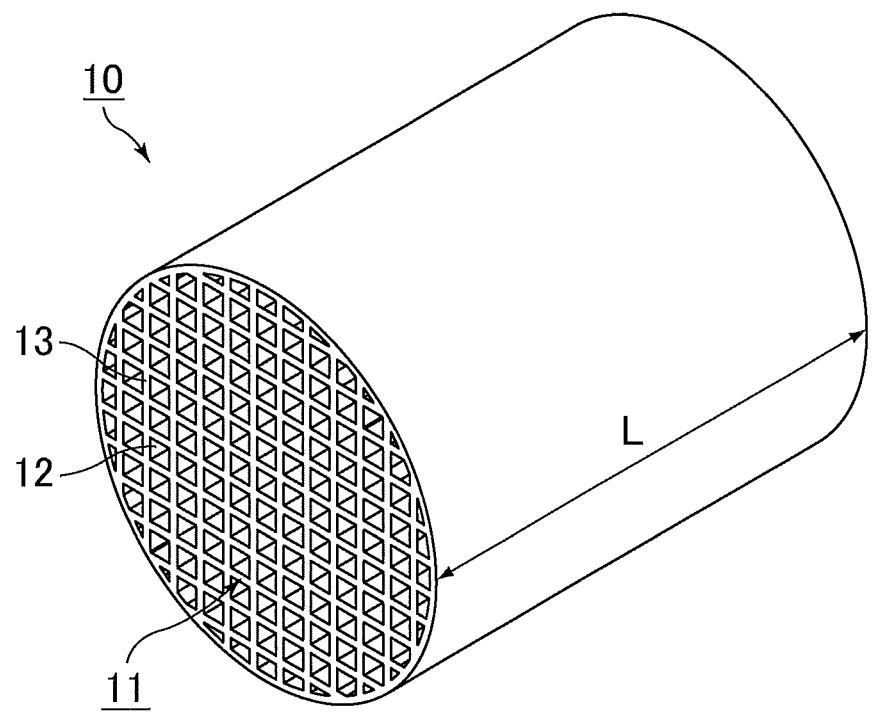
FIG. 1 is a perspective view schematically showing an exemplary honeycomb structured body obtained by the method of producing a honeycomb structured body of the present invention.

FIG. 1 is a perspective view schematically showing an exemplary honeycomb structured body obtained by the method of producing a honeycomb structured body of the present invention.

A honeycomb structured body 10 shown in FIG. 1 includes a single honeycomb fired body 11 in which multiple through-holes 12 are arranged longitudinally (a direction indicated by a double-headed arrow L in FIG. 1) in parallel with one another with a partition wall 13 therebetween. The honeycomb fired body 11 contains CZ particles and alumina particles, and is in the form of an extrudate.

When the honeycomb structured body 10 includes a single honeycomb fired body 11 as shown in FIG. 1, the honeycomb structured body 10 is the honeycomb fired body.

In the honeycomb structured body, the honeycomb fired body contains CZ particles, alumina particles, an inorganic binder, and inorganic fibers.

As described later, the honeycomb fired body is produced by extrusion-molding a raw material paste containing CZ particles, alumina particles, an inorganic binder, and inorganic fibers, and firing the resulting extrudate.

Whether or not the honeycomb structured body of the present invention contains the CZ particles and the alumina particles can be confirmed by X-ray diffraction (XRD).

The honeycomb structured body may include a single honeycomb fired body or multiple honeycomb fired bodies. The multiple honeycomb fired bodies may be combined together with an adhesive layer therebetween.

In the honeycomb structured body, a peripheral coat layer may be formed on the outer periphery of the honeycomb fired body.

In the honeycomb structured body of the present invention, the honeycomb fired body preferably has a porosity of 45 to 70 vol %.

The honeycomb fired body having a porosity of 45 to 70 vol % can provide high mechanical strength and exhaust gas conversion performance at the same time.

When the honeycomb fired body has a porosity of less than 45 vol %, the percentage of pores that can contribute to diffusion of gas into the partition walls is low, which may decrease the exhaust gas conversion performance. When the honeycomb fired body has a porosity of more than 70 vol %, the porosity is so high that the honeycomb structured body has poor mechanical characteristics, and the honeycomb structured body easily cracks, breaks, or the like during use.

The porosity of the honeycomb fired body can be measured by a weighing method described below.

(1) The honeycomb fired body is cut in size of 10 cells×10 cells×10 mm to obtain a measurement sample. The measurement sample is ultrasonically washed with deionized water and acetone, and dried in an oven at 100° C. The measurement sample having a size of 10 cells×10 cells×10 mm is a sample that is cut out such that the sample includes 10 through-holes aligned longitudinally×10 through-holes aligned transversely, outermost through-holes, and the partition walls constituting the through-holes, with the longitudinal length being 10 mm.

(2) Using a measuring microscope (Measuring Microscope MM-40 available from Nikon, magnification: 100 times), the cross-sectional dimension of the measurement sample is measured, and the volume is determined from a geometric calculation (when the volume cannot be determined from a geometric calculation, the volume is measured by measuring the water-saturated weight and the weight in water).

(3) The weight of the measurement sample based on assumption that the measurement sample is a completely dense body is calculated from the calculated volume and the true density of the measurement sample measured with a pycnometer. A measurement procedure using a pycnometer is as described in (4) below.

(4) The honeycomb fired body is pulverized to prepare 23.6 cc of powder. The powder is dried at 200° C. for 8 hours. Subsequently, the true density is measured according to JIS R 1620:1995, using Auto Pycnometer 1320 available from Micromeritics. The evacuation time is 40 minutes.

(5) The actual weight of the measurement sample is measured using an electric balance (HR202i available from A & D).

(6) The porosity of the honeycomb fired body is determined by the following formula.

(Porosity of honeycomb fired body)=100−(actual weight of measurement sample/weight of measurement sample based on assumption that the measurement sample is a completely dense body)×100[%]

Even when a noble metal is directly supported on the honeycomb structured body of the present invention, changes in the porosity of honeycomb fired body due to the noble metal are small enough to be ignored.

The alumina particles constituting the honeycomb structured body are preferably θ-phase alumina particles.

When the alumina particles are θ-phase alumina particles, owing to their high heat resistance, the honeycomb Structured body carrying a noble metal can exhibit high exhaust gas conversion performance even after long-term use.

The inorganic binder content is preferably 0.1 to 10 wt %, and the inorganic fiber content is preferably 10 to 40 wt %.

The shape of the honeycomb structured body is not limited to a round pillar shape. Examples of the shape include a prism, a cylindroid shape, a pillar shape having an end face with a racetrack shape, and a prism with rounded corners (e.g., a triangular pillar shape with rounded corners).

In the honeycomb structured body, the shape of the through-holes of the honeycomb fired body is not limited to a quadrangular pillar shape. For example, it may be a triangular pillar shape or a hexagonal pillar shape.

In the honeycomb structured body, the density of the through-holes in a cross section perpendicular to the longitudinal direction of the honeycomb fired body is preferably 31 to 155 pcs/cm$^2$.

In the honeycomb structured body, the thickness of the partition wall of the honeycomb fired body is preferably 0.05 to 0.50 mm, more preferably 0.10 to 0.30 mm.

In the honeycomb structured body, when a peripheral coat layer is formed on the outer periphery of the honeycomb fired body, the thickness of the peripheral coat layer is preferably 0.1 to 2.0 mm.

The honeycomb structured body may include a single honeycomb fired body or multiple honeycomb fired bodies. The multiple honeycomb fired bodies may be combined together with an adhesive layer therebetween.

In the honeycomb structured body, a noble metal is preferably supported on the honeycomb fired body.

The honeycomb structured body in which a noble metal that functions as a catalyst is supported on the honeycomb fired body can be used as a honeycomb catalytic converter for exhaust gas conversion.

Examples of the noble metal include platinum, palladium, and rhodium.

In the honeycomb structured body, the amount of the noble metal supported is preferably 0.1 to 15 g/L, more preferably 0.5 to 10 g/L.

The term "amount of the noble metal supported" as used herein refers to the weight of the noble metal per apparent volume of the honeycomb structured body. The apparent volume of the honeycomb structured body includes the pore volumes. It includes the volume of the peripheral coat layer and/or the volume of an adhesive layer.

[Method of Producing Honeycomb Structured Body]

Next, the method of producing a honeycomb structured body of the present invention is described.

The present invention provides a method of producing a honeycomb structured body including a honeycomb fired body in which multiple through-holes are arranged longitudinally in parallel with one another with a partition wall therebetween, the method including: a raw material mixing step of preparing a raw material paste containing ceria-zirconia composite oxide particles, alumina particles, an inorganic binder, and inorganic fibers; a molding step of molding the raw material paste into a honeycomb molded body in which multiple through-holes are arranged longitudinally in parallel with one another with a partition wall therebetween; a drying step of drying the honeycomb molded body obtained in the molding step; and a firing step of firing the honeycomb molded body dried in the drying step into a honeycomb fired body, wherein the raw material mixing step includes pre-mixing of the inorganic binder and the inorganic fibers.

(Raw Material Mixing Step)

In the raw material mixing step, a raw material paste containing CZ particles, alumina particles, an inorganic binder, and inorganic fibers is prepared. Here, the inorganic binder and the inorganic fibers are pre-mixed together.

Any material may be used to constitute the inorganic fibers. Examples include alumina, silica, silicon carbide, silica alumina, glass, potassium titanate, and aluminum borate. Two or more of these may be used in combination of these, alumina is preferred.

Any inorganic binder may be used. Examples include solids contained in materials such as alumina sol, silica sol, titania sol, sodium silicate, sepiolite, attapulgite, and boehmite. Two or more of these may be used in combination. Of these, boehmite is preferred.

Boehmite is alumina monohydrate with a composition of AlOOH, and has good dispersibility in media such as water. Thus, in the method for producing a honeycomb structured body of the present invention, boehmite is preferably used as the binder.

The inorganic binder and the inorganic fibers may be pre-mixed together using a mixer, an attritor, a kneader, or the like. A dispersion medium may be added, if necessary. Any dispersion medium may be used. Examples include water, organic solvents such as benzene, and alcohols such as methanol. Two or more of these may be used in combination.

Auxiliary agents such as a surfactant may also be added.

The inorganic binder and the inorganic fibers are pre-mixed together, and the obtained mixture is further mixed with the CZ particles and the alumina particles, whereby the raw material paste is obtained.

Use of alumina particles having an average particle size of 1 to 30 μm is preferred.

Use of CZ particles having an average particle size of 1 to 10 μm is preferred.

Further, the average particle size of the alumina particles to be use is preferably larger than the average particle size of the CZ particles.

The average particle size of the CZ particles and the alumina particles can be measured using a laser diffraction particle size distribution meter (Mastersizer 2000 available from Malvern Panalytical).

The weight ratio of the ceria-zirconia composite oxide particles to the alumina particles (ceria-zirconia composite oxide particles/alumina particles) for use in preparation of the raw material paste is preferably 1.0 to 3.0.

When the weight ratio (ceria-zirconia composite oxide particles/alumina particles) is 1.0 to 3.0, the ceria-zirconia composite oxide particle content is high, which improves the exhaust gas conversion performance because the ceria-zirconia composite oxide particles are used as co-catalysts.

The alumina particles for use in preparation of the raw material paste are preferably θ-phase alumina particles.

Examples of other raw materials for use in preparation of the raw material paste include organic binders, pore-forming agents, forming auxiliaries, and dispersion media.

Any organic binder may be used. Examples include methyl cellulose, carboxymethyl cellulose, hydroxyethyl cellulose, polyethylene glycol, phenolic resin, and epoxy resin. Two or more of these may be used in combination.

Any dispersion medium may be used. Examples include water, organic solvents such as benzene, and alcohols such as methanol. Two or more of these may be used in combination.

Examples of the pore-forming agent include acrylic resin, starch, and carbon.

The average particle size of the pore-forming agent is not limited, but is preferably 10 to 60 μm.

The average particle size of the pore-forming agent can be measured using a laser diffraction particle size distribution meter (Mastersizer 2000 available from Malvern Panalytical), as in the case of the average particle size of the alumina particles and the CZ particles.

Any forming auxiliary may be used. Examples include ethylene glycol, dextrins, fatty acids, fatty acid soaps, and polyalcohols. Two or more of these may be used in combination.

When the CZ particles, alumina particles, inorganic fibers, and inorganic binder are used as the materials of the raw material paste, the percentage of each of these materials relative to the total solids remaining in the raw material paste after the firing step is preferably as follows: CZ particles: 40 to 60 wt %; alumina particles: 15 to 35 wt %; inorganic fibers: 10 to 40 wt %, and inorganic binder: 0.1 to 10 wt %.

The percentage of the dry volume of the pore-forming agent in the dry volume of the raw material paste is preferably 45 to 70 vol %.

The weight ratio of the CZ particles to the alumina particles (CZ particles/alumina particles) for use in preparation of the raw material paste is preferably 1.0 to 3.0.

When the weight ratio (CZ particles/alumina particles) is 1.0 to 3.0, the CZ particle content is high, which can enhance the action of a catalyst supported and improve the exhaust gas conversion performance of the honeycomb catalytic converter because the CZ particles are used as co-catalysts.

Preparation of the raw material paste preferably involves mixing/kneading of the above raw materials. A device such as a mixer or an attritor may be used for mixing, or a device such as a kneader may be used for kneading.

(Molding Step)

In the molding step, the raw material paste obtained in the raw material mixing step is molded into a honeycomb molded body in which multiple through-holes are arranged longitudinally in parallel with one another with a partition wall therebetween.

For example, the raw material paste can be molded by a method such as extrusion molding.

Specifically, the raw material paste is passed through a die of a specific shape to form a continuous honeycomb molded body having through-holes of a specific shape, and the continuous honeycomb molded body is cut to a specific length, whereby a honeycomb molded body is obtained.

(Drying Step)

The method of producing a honeycomb structured body of the present invention includes drying the molded body obtained in the molding step.

Here, preferably, a dryer such as a microwave dryer, a hot-air dryer, a dielectric dryer, a reduced-pressure dryer, a vacuum dryer, or a freeze-dryer is used to dry the honeycomb molded body into a honeycomb dried body.

Herein, the honeycomb molded body and the honeycomb dried body before the firing step are also collectively referred to as a "honeycomb molded body".

(Firing Step)

In the firing step, the molded body dried in the drying step is fired into a honeycomb fired body. In this step, the honeycomb molded body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours. The atmosphere of the firing step is not limited, but an atmosphere with an oxygen concentration of 1 to 20% is preferred.

The honeycomb structured body of the present invention can be produced by the above steps.

(Other Steps)

The method of producing a honeycomb structured body of the present invention may further include a supporting step of allowing a noble metal to be supported on the honeycomb fired body, if necessary.

Examples of the method for allowing a noble metal to be supported on the honeycomb fired body include a method in which the honeycomb fired body or the honeycomb structured body is immersed in a solution containing noble metal particles or a noble metal complex, and the honeycomb fired body or the honeycomb structured body is then removed and heated.

When the honeycomb structured body includes a peripheral coat layer, a noble metal may be supported on the honeycomb fired body before the peripheral coat layer is formed, or a noble metal may be supported on the honeycomb fired body or the honeycomb structured body after the peripheral coat layer is formed.

In the method of producing a honeycomb structured body of the present invention, the amount of the noble metal supported in the supporting step is preferably 0.1 to 15 g/L, more preferably 0.5 to 10 g/L.

When the method of producing a honeycomb structured body of the present invention includes forming a peripheral coat layer on the outer periphery of the honeycomb fired body, the peripheral coat layer can be formed by applying a peripheral coat layer paste to the outer periphery of the honeycomb fired body excluding both end faces thereof, and then solidifying the peripheral coat layer paste by drying. A paste having the same composition as the raw material paste can be used as the peripheral coat layer paste.

EXAMPLES

Examples that more specifically disclose the present invention are described below. The present invention is not limited to these examples.

Preparation of Evaluation Sample

Example 1

First, alumina fibers (average fiber diameter: 3 μm; average fiber length: 60 μm) (10.6 wt %), boehmite as an inorganic binder (2.8 wt %), and ion-exchanged water (10.0 wt %) were pre-mixed together for 10 minutes.

Subsequently, the following materials were mixed/kneaded into a raw material paste: CZ particles (average particle size: 2 μm) (16.9 wt %); γ-alumina particles (average particle size: 2 μm) (8.5 wt %); methylcellulose as an organic binder (3.9 wt %); an acrylic resin (average particle size: 32 μm) (28.1 wt %); polyoxyethylene oleyl ether (surfactant) as a forming auxiliary (2.9 wt %); and deionized water (16.2 wt %).

The average particle sizes of the γ-alumina particles, CZ particles, and pore-forming agent were measured using a laser diffraction particle size distribution meter (Mastersizer 2000 available from Malvern Panalytical).

Using an extruder, the raw material paste was extrusion-molded into a round pillar-shaped honeycomb molded body. Then, using a reduced-pressure microwave dryer, the honeycomb molded body was dried at an output of 1.74 kW under a reduced pressure of 6.7 kPa for 12 minutes, and then degreased/fired at 1100° C. for 10 hours, whereby a honeycomb fired body was produced. The honeycomb fired body had a round pillar shape with a diameter of 103 mm and a length of 80 mm in which the density of the through-holes was 77.5 pcs/cm$^2$ (500 cpsi) and the thickness of the partition wall was 0.127 mm (5 mil).

Comparative Example 1

A honeycomb structured body according to Comparative Example 1 was produced by the same procedure as in Example 1 except that all the raw materials of the raw material paste were mixed at once.

[Measurement of Three-Point Bending Strength and Observation of Fracture Cross Section]

First, to obtain a sample for measuring the three-point bending strength, raw material pastes obtained by mixing and kneading using the same composition as in Example 1 and Comparative Example 1 were molded into cuboids, and the cuboids were degreased and fired under the same conditions, and cut into pieces having a size of 6 mm×6 mm×40 mm. Ten such pieces were prepared for each example as samples for measuring the three-point bending strength (hereinafter referred to as "samples"). A load was vertically applied to a main surface of each sample (a larger surface of the outer periphery of the sample), and the fracture load (load at which the sample was fractured) was measured. The fracture load was measured for ten samples for measuring the three-point bending strength in each example, and the average value was regarded as the bending strength. The three-point bending strength test was performed with reference to JIS R 1601, using Instron 5582 with a span distance of 30 mm at a speed of 1 mm/min. The three-point bending strength was 6.9 MPa in Example 1 and 5.2 MPa in Comparative Example 1.

Figure 2:
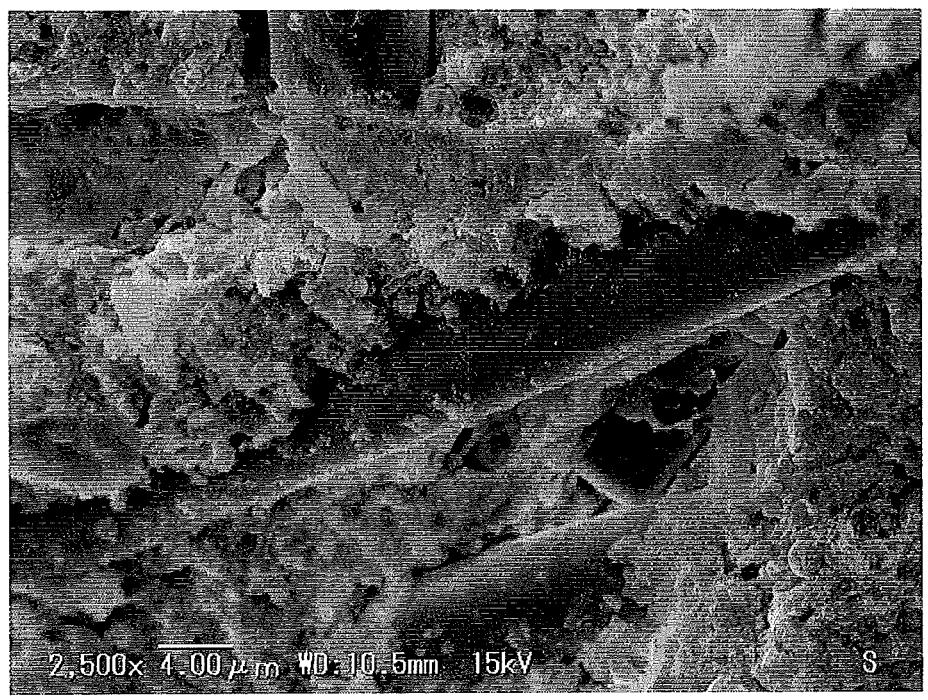
FIG. 2 is an SEM image of a fracture cross section of a honeycomb structured body according to Example 1.
Figure 3:
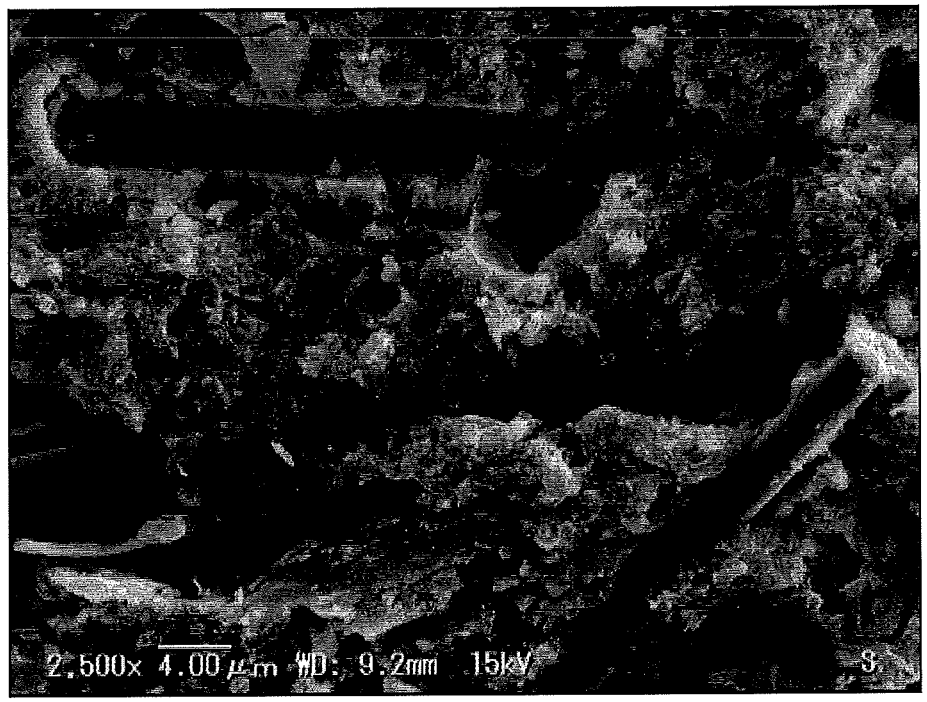
FIG. 3 is an SEM image of a fracture cross section of a honeycomb structured body according to Comparative Example 1.

Further, the surface exposed by the fracture (fracture cross section) was observed by SEM. FIG. 2 and FIG. 3 show the results. FIG. 2 is an SEM image of a fracture cross section of the honeycomb structured body according to Example 1. FIG. 3 is an SEM image of a fracture cross section of the honeycomb structured body according to Comparative Example 1.

The results in FIG. 2 and FIG. 3 show that the alumina fibers were not pulled out from the base material in the fracture cross section of the sample according to Example 1 while the alumina fibers were pulled out in the fracture cross section of the sample according to Comparative Example 1. These results show that the honeycomb structured body produced by the method of producing a honeycomb structured body of the present invention has excellent mechanical strength with good bonding properties between the alumina fibers and other materials.

REFERENCE SIGNS LIST 10 honeycomb structured body
11 honeycomb fired body
12 through-hole
13 partition wall

The invention claimed is:

1. A method of producing a honeycomb structured body including a honeycomb fired body in which multiple through-holes are arranged longitudinally in parallel with one another with a partition wall therebetween, the method comprising:
   a raw material mixing step of preparing a raw material paste containing ceria-zirconia composite oxide particles, alumina particles, an inorganic binder, and inorganic fibers;
   a molding step of molding the raw material paste into a honeycomb molded body in which multiple through-holes are arranged longitudinally in parallel with one another with a partition wall therebetween;
   a drying step of drying the honeycomb molded body obtained in the molding step; and
   a firing step of firing the honeycomb molded body dried in the drying step into a honeycomb fired body,
   wherein the raw material mixing step includes pre-mixing of the inorganic binder and the inorganic fibers, and
   wherein the inorganic binder is boehmite.

2. The method of producing a honeycomb structured body according to claim 1,
   wherein the inorganic fibers are alumina fibers.

3. The method of producing a honeycomb structured body according to claim 2,
   wherein in the raw material mixing step, the weight ratio of the ceria-zirconia composite oxide particles to the alumina particles (ceria-zirconia composite oxide particles/alumina particles) is 1.0 to 3.0.

4. The method of producing a honeycomb structured body according to claim 2, further comprising a supporting step of allowing a noble metal to be supported on the honeycomb fired body.

5. The method of producing a honeycomb structured body according to claim 1,
   wherein in the raw material mixing step, the weight ratio of the ceria-zirconia composite oxide particles to the alumina particles (ceria-zirconia composite oxide particles/alumina particles) is 1.0 to 3.0.

6. The method of producing a honeycomb structured body according to claim 5, further comprising a supporting step of allowing a noble metal to be supported on the honeycomb fired body.

7. The method of producing a honeycomb structured body according to claim 1, further comprising a supporting step of allowing a noble metal to be supported on the honeycomb fired body.

* * * * *